US010084784B1

(12) United States Patent
Brandwine et al.

(10) Patent No.: US 10,084,784 B1
(45) Date of Patent: Sep. 25, 2018

(54) RESTRICTING ACCESS TO COMPUTING RESOURCES

(71) Applicant: Amazon Technologies, Inc., Seattle, WA (US)

(72) Inventors: Eric J. Brandwine, Haymarket, VA (US); Matthew Shawn Wilson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/558,281

(22) Filed: Dec. 2, 2014

(51) Int. Cl.
*H04L 29/06* (2006.01)
*G06F 9/455* (2018.01)

(52) U.S. Cl.
CPC .......... *H04L 63/10* (2013.01); *G06F 9/45533* (2013.01); *H04L 63/0442* (2013.01); *H04L 63/20* (2013.01)

(58) Field of Classification Search
CPC ..... H04L 63/10; H04L 63/0442; H04L 63/20; G06F 9/45533
See application file for complete search history.

(56) References Cited

U.S. PATENT DOCUMENTS

| 2013/0139271 A1* | 5/2013 | Arrelid | G06F 21/10 726/27 |
| 2014/0289839 A1* | 9/2014 | Chen | H04L 63/0807 726/9 |
| 2016/0119348 A1* | 4/2016 | Kus | H04L 63/10 726/1 |

OTHER PUBLICATIONS

Web Article: "VMware ESX" published by Wikipedia, 2014 [online][retrieved on Dec. 2, 2014] retrieved from: http://en.wikipedia.org/wiki/VMware_ESX , 13 pps.

* cited by examiner

*Primary Examiner* — Brandon S Hoffman
*Assistant Examiner* — Nega Woldemariam
(74) *Attorney, Agent, or Firm* — Lee & Hayes, PLLC

(57) ABSTRACT

Functionality is disclosed herein for providing a resource monitoring environment that restricts access to computing resource data in a service provider network. The resource monitoring environment processes requests to access computing resource data, and denies requests not signed or authorized by a customer of a service provider network or other entity. Access to the computing resource data includes access to non-obfuscated data and/or access to encrypted computing resource data encrypted by way of a public encryption key held by a customer of the service provider network or other entity instead of a requestor of the computing resource data.

22 Claims, 8 Drawing Sheets

RESTRICTING ACCESS TO COMPUTING RESOURCES

BACKGROUND

Service provider networks may provide many services, including distributed computing services that implement virtualization and scaled computing services. The virtualization and scaled computing services can be maintained by the service provider network, or a group of administrative employees or users employed by the owner or operator of the service provider network. The group of administrative employees can perform debugging services, performance regression services, or otherwise provide services related to maintenance of the infrastructure of the service provider network, including infrastructure related to the virtualization and scaled computing services.

It follows then, that the group of administrative employees may require access, under some circumstances, to certain components having sensitive information processed by the virtualization and scaled computing services. For example, administrative employees may require access to data belonging to customers of the service provider network. However, customers utilizing the service provider network may not desire some or all of their sensitive information to be accessible by the group of administrative employees.

The disclosure made herein is presented with respect to these and other considerations.

DETAILED DESCRIPTION

Figure 1:
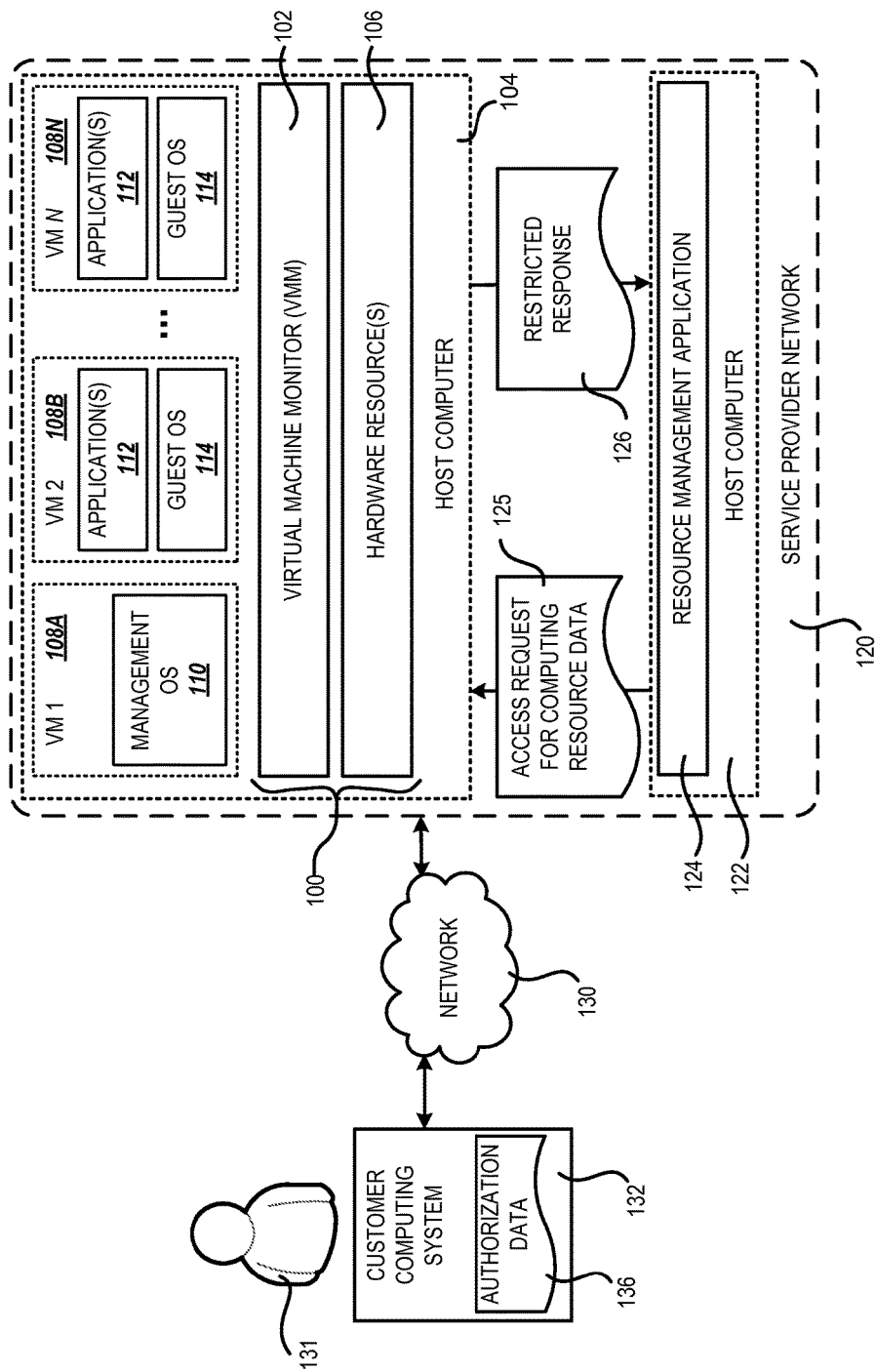
FIG. 1 is a system architecture diagram showing aspects of the configuration and operation of a resource monitoring environment in one configuration presented herein.

The following detailed description is directed to technologies for restricting access to computing resources. According to one implementation, a resource monitoring environment is deployed through a service provider network that restricts access to a portion of computing resources, or sensitive information processed or contained therein, through enforcement of an authorization policy selected or configured by a customer of the service provider network. The authorization policy may include a standard or default set of authorization protocols necessary to be satisfied by a user requesting and receiving access to computing resources governed by the authorization policy. The source code governing the resource monitoring environment and authorization policies may be externally audited, published, and/or peer-reviewed to provide assurances to customers that the particular forms of restricted access are performed correctly.

Generally, the resource monitoring environment may receive authorization information from a customer, and enforce the same for computing resource processing information for the customer. For example, a service provider network may provide virtualization services to the customer. The virtualization services allow the customer to deploy and process information according to applications deployed through the virtualization services. If maintenance or debugging of a portion of computing resources utilized by the virtualization services is requested or otherwise is necessary, an administrative user of the service provider network requesting access to the portion of the computing resources is only granted restricted access governed by the authorization protocols.

The restricted access may include access to non-sensitive information, obfuscation of sensitive information, encryption of sensitive information, or other forms of restrictions that limit access to computing resources while allowing only authorized viewing/access to non-sensitive information. The restricted access can be directly controlled by a customer through, for example, the settings of the authorization policy, secure signing of requests for sensitive information, secure signing of application programming interface (API) calls for issuing requests, and/or provision of one or more encryption keys for use by authorized users. The restricted access functionality may be provided through the resource monitoring environment as computer executed instructions processed through a virtual machine monitor (VMM), hypervisor, or resource management application.

It should be appreciated that the functionality provided by the resource monitoring environment might also be provided by specially configured hardware components. For example, and without limitation, the functionality described herein could be provided by a device configured to work in conjunction with a conventional VMM or hypervisor, such as a network device or specialized device adapter interfaced, or in communication with, bare metal hardware providing computing resources to virtual machine instances. Additional details regarding the various components and processes described above for implementing a resource monitoring environment will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, hand-held computers, personal digital assistants, e-readers, mobile telephone devices, tablet computing devices, special-purposed hardware devices, network appliances, and the like. As mentioned briefly above, the configurations described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a system architecture diagram showing aspects of the configuration and operation of a resource monitoring environment 100 in one configuration presented herein. As shown in FIG. 1, and described briefly above, the resource monitoring environment 100 might operate within or in conjunction with a service provider network 120, from which customers can purchase and utilize computing resources, such as virtual machine instances 108A-108N (referred to herein in the singular as "virtual machine instance 108" and the plural as "virtual machine instances 108), and/or other types of computing resources, from a service provider on a permanent or as-needed basis.

Each type or configuration of a computing resource may be available from the service provider network 120 in different sizes. For example, a service provider might offer virtual machine instances 108 or other types of data processing resources that are available for purchase and use that have many different configurations of processor capabilities, main memory, disk storage, and operating system. A service provider might also offer other types of resources for purchase and use by customers. For example, a service provider might offer hardware devices, database resources, file or block data storage resources, and/or networking resources, such as load balancing resources, DNS resources, virtual private cloud (VPC) resources, virtual local area network (VLAN) resources, and/or other types of hardware and software computing resources on a permanent or as-needed basis.

The service provider operating the service provider network 120 might also charge a fee for operating the resources to a customer that creates and uses the resources. The fee charged for a particular resource might be based upon the type and/or configuration of the resource, and or a particular form of restricted access or encryption of sensitive information, as described herein. The fee charged for the restricted access may be based on a selection of particular authorization data, selection of different levels of restricted access security, or any other attribute. The fee charged for a particular resource might also be based upon the amount of time the resource is utilized or how many times restricted access is requested by a customer, for example, through requesting maintenance of a particular resource. For example, in the case of a data processing resource, like a virtual machine instance 108, the fee for use of the resource might be charged based upon the amount of time the resource is utilized. In the case of a data storage resource, the fee might be computed based upon the amount of data stored and/or the amount of data transferred into or out of the resource. The fees for other types of resources might also be based upon other considerations. A service provider might also utilize various purchasing models to determine the amount to charge a customer for use of resources provided by the service provider network 120.

The resources described above may be provided in one particular implementation by one or more data centers operated by the service provider. As known to those skilled in the art, data centers are facilities utilized to house and operate computer systems and associated components. Data centers also typically include redundant and backup power, communications, cooling, and security systems. The data centers might be located in geographically disparate locations, and might also be connected to various other facilities, such as co-location facilities, and various wide area networks (WANs), such as the Internet. In the environment shown in FIG. 1, a service provider might operate one or more data centers configured to provide the resources in the service provider network 120 to its customers.

The resources described briefly above might also be provisioned and de-provisioned as needed in an automated fashion. For example, the service provider network 120 might instantiate a new instance of a computing resource, such as a virtual machine instance 108, in response to an increase in demand for a service. Other types of computing resources might also be provisioned and de-provisioned in a similar manner. The service provider network might also provide functionality for automatically scaling and/or de-scaling resources based upon demand for the resources or other factors.

A customer 131 or potential customer of the service provider network 120 might utilize a customer computing system 132 to communicate with the service provider network 120 over an appropriate data communications network 130. The customer computing system 132 may also operate independently or automatically. In this way, the customer computing system 132 may be utilized to configure various aspects of the operation of the computing resources provided by the service provider network 120. For example, and without limitation, the customer computing system 132 may be utilized to purchase computing resources in the service provider network 120, to configure aspects of the operation of the computing resources, and to perform other types of functionality with regard to the operation of the computing resources provided by the service provider network 120.

The customer computing system 132 may be any type of computing device capable of connecting to the service provider network 120 via a suitable data communications network such as, but not limited to, a laptop or desktop computer, a tablet computing device, a server computer, or a mobile telephone. Administrative users employed by the operator of the service provider network 120, may also connect with and utilize resources provided by the service provider network 120 in a similar fashion through host computer 122.

The service provider network 120 may also be configured to provide various types of virtual machine instances for use by customer 131 and other customers. For example, and without limitation, the service provider network 120 may be configured to provide standard virtual machine instances, processor- or memory-intensive instances, cluster computing instances, high throughput instances, and/or restricted access instances. Additional details regarding one implementation of the service provider network 120 and the various types of virtual machine instances that might be provided thereby for customer use will be provided below with regard to FIGS. 5-7.

As discussed briefly above, a resource monitoring environment 100 is disclosed herein that operates within or in conjunction with the service provider network 120. The resource monitoring environment 100 may include a virtual machine monitor (VMM) 102, hardware resources 106, and/or resource management application 124 according to some implementations. The resource monitoring environment is an environment configured to restrict access to computing resources such as virtual machine instances 108 from certain users of the service provider network 120.

The VMM 102, which in some configurations might be implemented as a hypervisor, allows multiple independent guest operating systems 114 to concurrently execute on a single host computer 104. The VMM 102 abstracts the hardware resources 106 of the host computer 104 to create one or more virtual machines 108A-108N. The VMM 102 may be implemented in the hardware of the host computer 104, or it may be implemented as a software module that executes at a low-level in the host computer 104 to provide services to the virtual machines 108.

One virtual machine 108A may host a management OS 110. The management OS 110 may be automatically started by the VMM 102 upon startup of the host computer 104, and may provide administrators of the host computer 104 tools and facilities for managing the VMM 102 and the other virtual machines 108B-108N. The virtual machine 104A hosting the management OS 110 may execute at a higher privilege level than the other virtual machines 108B-108N, and the management OS 110 may also provide services to the other virtual machines through the VMM 102, such as loading of hardware drivers for the host computer, virtualizing hardware resources within virtual machines 108B-108N, arbitrating access to the hardware 106 of the host computer 104, and the like.

Each virtual machine 108B-108N may run an instance of a guest OS 114 as well as execute one or more applications 112 to provide services to customers 104 and other end users across the network 130. According to one configuration, the VMM 102 may support both paravirtualized and unmodified guest OSs 114. A paravirtualized guest OS 114 is modified to run in a virtual machine 108 provided by the VMM 102, while an unmodified guest OS 114 may be a version of an operating system that is configured to execute directly on physical hardware. Guest OSs 114 may include the MICROSOFT® WINDOWS® operating system from MICROSOFT Corporation of Redmond, Wash., the ORACLE® SOLARIS operating system from ORACLE Corporation of Redwood City, Calif., the LINUX operating system, the UNIX operating system, the NetBSD operating system, and the like.

It will be appreciated that the technologies described herein may be enabled by other virtualization architectures beyond the virtualization architecture described above and shown in FIG. 1. For example, the management OS 110 may run directly above and control access to the hardware 106 of the host computer 104. In addition, while VMM 102 is illustrated as separate from the management OS 110, configurations where the functionality of the management OS and VMM are integrated are within the scope of this disclosure.

According to various configurations, the VMM 102, in conjunction with the management OS 110, controls the virtualization of the hardware resources 106 ("hardware") of the host computer 104 in the virtual machines 108. The hardware 106 includes central processing units (CPUs) or processors, physical memory, network interface cards (NICs), local storage devices, input/output (I/O) controllers, and the like. The hardware 106 may also be interfaced with, or include, a specialized device adaptor configured to implement the resource monitoring environment 100, in some implementations. The VMM 102 and/or management OS 110 may create each virtual machine 108 with a specific virtualized hardware configuration or instance type, as discussed briefly above. For example, the VMM 102 may restrict the CPU instructions available in a virtual machine 108 in order to limit the guest OS 114 and application(s) 112 executing in the virtual machines to a well-defined instruction set compatible across a variety of host computers 104. Similarly, the VMM 102 may limit the available registers, the amount of main memory, the amount of cache memory, the number of interrupts, the number of networking addresses, and other hardware resources available in the virtualized hardware configuration of each virtual machine 108. In addition, the VMM 102 and/or management OS 110 may provide emulation of a specific hardware platform or architecture, within a virtual machine 108.

The virtualized hardware configuration utilized by the VMM 102 and/or management OS 110 to create each virtual machine 108 may be based on the configuration parameters defined for an instance type, as well as authorization data 136 provided by customer 131. A variety of instance types, as well as a particular restricted access instance type, are described more fully below with reference to FIG. 7.

According to various configurations, a host computer 122, which might be configured similarly to host computer 104, is operative to allow administrative users of the service provider network 120 to attempt to access, manage, debug, and otherwise control computing resources of the host computer 104, and of virtual machines 108. Various applications and/or other functionality may be executed in the host computer 122. The components executed on the host computer 122, for example, might include a resource management application 124 and other applications, services, processes, systems, engines, or functionality not discussed in detail herein The resource management application 124 is executed to provide a control layer for provisioning a plurality of host computers 104 within the service provider network 120 in one configuration. For example, the resource management application 124 may assign customers to particular host computers 104 in the service provider network 120. Also, the resource management application 124 may include a network-based interface for customers to control and manage their computing resources in the service provider network 120, or authorize management of their computing resources through the functionality described herein.

According to one implementation, an application programming interface (API) for requesting access to computing resources may be exposed by the VMM 102 or hardware resources 106. Thereafter, an access request for computing resource data 125 may be issued through resource management application 124. The access request 125 can be a request originating from an administrative user of the service provider network 120, and can describe one or more resources that the administrative user wishes to access. For example, the resources can include memory, disk I/O, and/or network traffic information. The resources can also include other types of computing resource data not particularly described herein. The access request for computing resource data 125 is organized or formatted according to the API exposed through the VMM 102 and/or hardware resources 106.

Upon receipt of the access request 125, the VMM 102 can process the access request 125 based on authorization data 136 provided by the customer 131 and/or a particular virtual machine instance type targeted by the access request 125, and either deny the access request 125 or provide a restricted response 126. The authorization data 136, access request 125, and restricted response 125 can take many forms depending upon any desired or particular implementation of the technologies described herein. Particular examples of the authorization data 136, access request 125, and restricted response 126 are described more fully below with reference to FIGS. 2-4.

Figure 2:
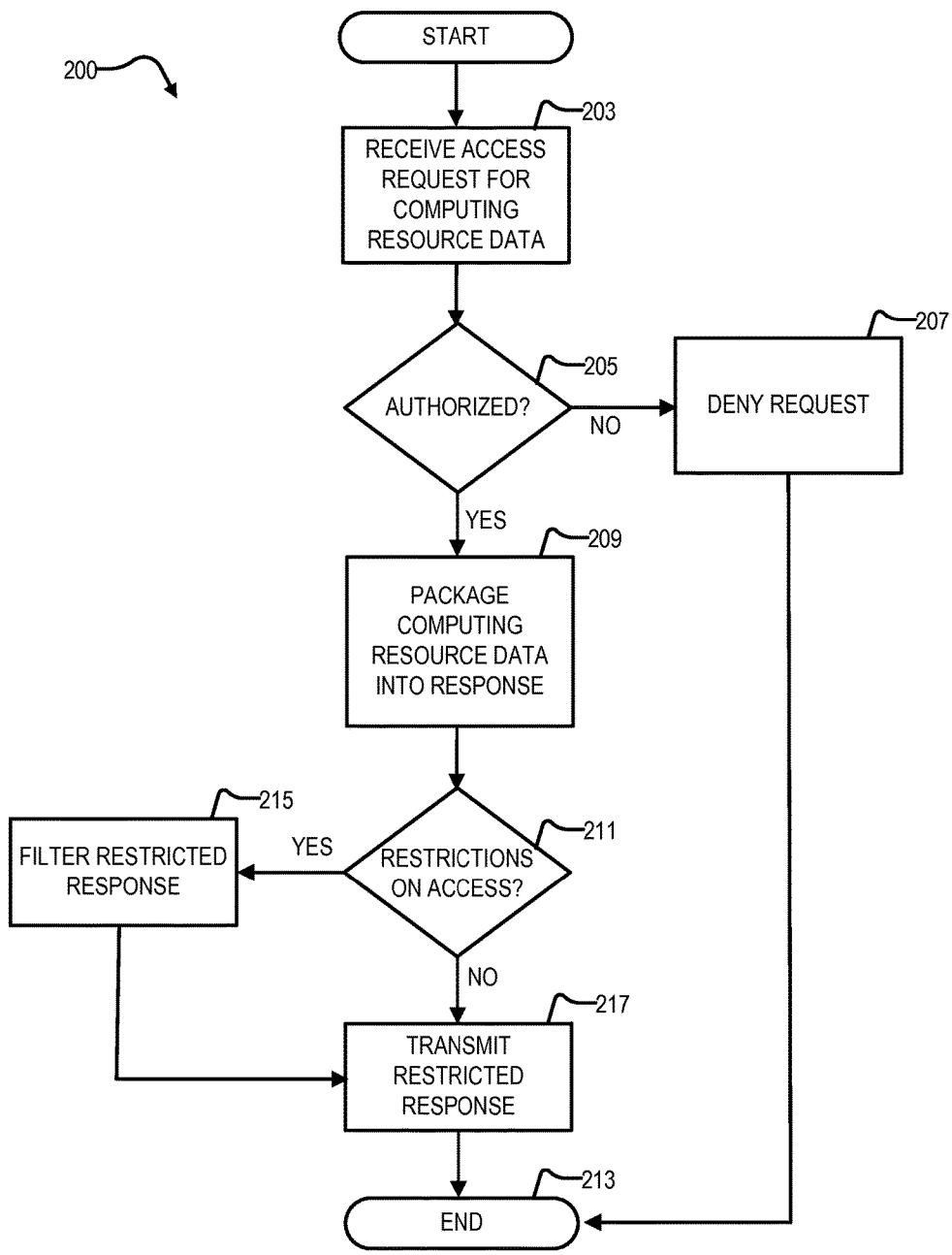
FIG. 2 is a flow diagram illustrating aspects of the operation of a resource monitoring environment in one configuration described herein.

Hereinafter, operation of the resource monitoring environment 100 is described with reference to FIGS. 2-4. FIG. 2 is a flow diagram of a method 200 illustrating aspects of the operation of the resource monitoring environment 100 in one configuration described herein. The method 200 may include receiving authorization data 136, from customer 131. Generally, the authorization data 136 includes a description of an authorization policy selected or configured by the customer 131. Alternatively, the authorization data 136 can originate elsewhere, or through instantiating of a virtual machine instance.

The authorization data 136 can be based on a standard or default set of authorization protocols necessary to be satisfied by a user requesting and receiving access to computing resources governed by the authorization policy, in some implementations. Alternatively, or in combination, the authorization data 136 can include signed certificates denoting authorization for access of computing resources by appropriate administrative users of the service provider network 120, one or more encryption keys designated by the customer 131 for use in asymmetrical encryption protocols for encrypting all or some of the information included in associated computing resources, and/or one or more signed API functions for use in requesting or formulating requests 125. Other forms of authorization data 136 may also be applicable in some implementations. Accordingly, the particular forms set forth here are merely illustrative, and not limiting of every possible implementation.

The receipt of the authorization data 136 can be facilitated through any appropriate form of transmission. For example, the authorization data 136 can be provided upon initiating a particular virtual machine instance 108, may be provided by an API call by the instantiated virtual machine instance 108 or the customer computing system 132, or it can be emailed or messaged to the service provider network 120. Still further, the authorization data 136 can be installed from within the guest OS 114 at the instantiated virtual machine 108 through, for example, an application 112, drive installation, virtual device installation, virtual disk access, or other suitable manner. Other forms of receipt of the authorization data 136 may also be applicable in some implementations. Accordingly, the particular forms set forth here are merely illustrative, and not limiting of every possible implementation.

Upon receipt and/or processing of the authorization data 136, the method 200 begins by receiving an access request for computing resource data 125, at block 203. The access request 125 can be formulated or created by an authorized user of the service provider network 120, and can be based on the API exposed through the resource monitoring environment 100. The access request 125 can include a description of resources the user wishes to access, such as memory, disk I/O, and/or network traffic information. The access request 125 can include a memory range or offset, a declaration of a particular disk, or a time range or other information that can be used to identify the particular memory, disk, and/or network traffic being requested.

Responsive to the access request, the resource monitoring environment 100 can determine whether the access request 125 is an authorized request at block 205. For example, the VMM 102 can determine through processing of the authorization data 136 if restricted access is enabled, or if the particular administrative user issuing the request is an authorized requestor. Still further, the VMM 102 can determine whether the request 125 includes or is part of a signed API call signed by the customer 131. Other forms of determination are also possible, including requiring credentials signed by the customer 131, requiring a particular level of system access or employment information from the service provider network 120, or requiring a supervisor or third party to provide additional authorization information to validate the access request 125.

If the access request 125 is not determined to be an authorized request, the request can be denied at block 207, and the method 200 may cease at block 213 until a new request or renewed authorization data 136 is received. Alternatively, the VMM 102 and/or resource monitoring environment 100 may not deny the request but simply not respond at all, or do nothing in response to the non-authorized request.

If the access request 125 is determined to by a valid or authorized request, the VMM 102 can package the computing resources described by the request 125 based on the authorization data to form a restricted response 126 based on any restrictions on access determined through block 211 and filtering of restricted computing resource data at block 215. The packaging can include, for example, obfuscation of sensitive information, blacking out of memory ranges including sensitive information, encryption of sensitive information, or other forms of restricting access to sensitive information, while still allowing viewing of non-sensitive information. For example, non-sensitive information or non-sensitive data can include, but is not limited to, destination/source information, memory range descriptions (without actual contents), aggregate instruction processing information or statistics, header information, and other non-sensitive information. Additionally, sensitive information or sensitive data is data for which a customer of the service provider network has indicated that access is to be restricted. The obfuscation of sensitive information may be performed at the VMM 102, or for example, through a user interface at the resource management application 124, in some implementations.

Upon packaging and filtering of the restricted response 126, the restricted response 126 is transmitted to the requestor at block 217, and the method 200 ceases at block 213. The transmission can be limited to secure transmission through the service provider network 120 to ensure the only recipient is the authorized requestor. Varying forms of security in the transmission are applicable, and any suitable form is within the scope of this disclosure.

As described above, obfuscation of sensitive information may be facilitated and, therefore, restricted access can be provided through operation of the resource monitoring environment 100 validating requests for computing resources. It should be appreciated that although all sensitive information can be obfuscated through the technologies described herein, some or all of the sensitive information may also be accessible if particularly desired by the customer 131. For example, if the customer 131 desires or permits access to a portion of sensitive information to enable debugging or maintenance, the filtering of block 215 may include obfuscation of only information the customer 131 does not permit access to.

Furthermore, secondary authorization or multi-tiered restricted access to computing resources are possible through interactions with a customer. FIGS. 3 and 4 are flow diagrams of methods 300 and 313 illustrating aspects of the operation of a resource monitoring environment providing restricted access to sensitive information, in one configuration disclosed herein.

Figure 3:
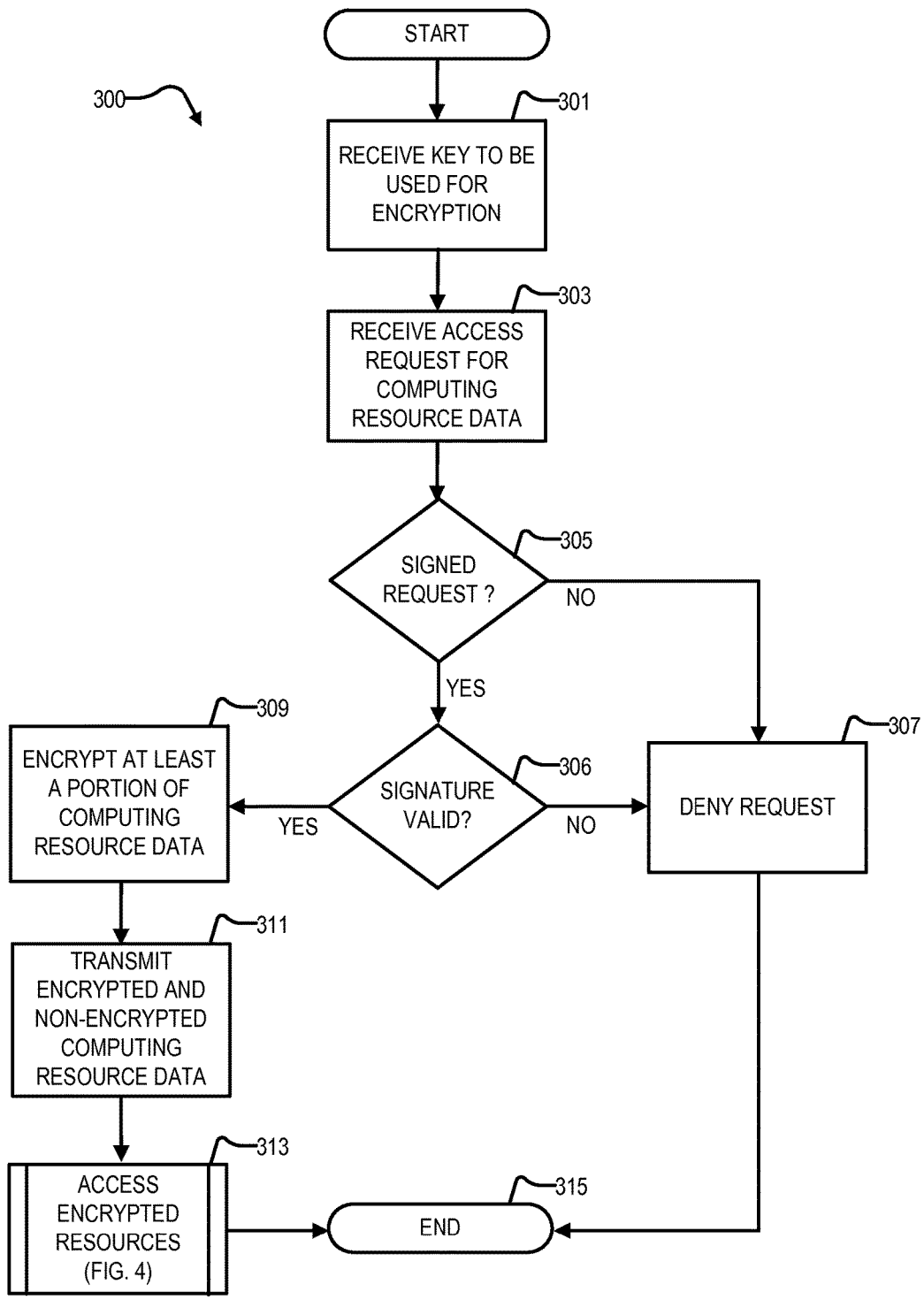
FIG. 3 is a flow diagram illustrating aspects of the operation of a resource monitoring environment in one configuration disclosed herein.

As shown in FIG. 3, the method 300 includes receiving a key to be used for encryption from the customer 131, at block 301. The key may be included within the authorization data 136. The key may be a "public key" enabling asymmetrical encryption such that only authorized users can decrypt information using a "private key" or a secure decryption key.

The method 300 further includes receiving an access request for computing resource data 125, at block 303. The access request 125 can be formulated as described above, including being based on the exposed API, signed API calls, or otherwise authorized by the customer 131.

The VMM 102 determines whether the access request 125 is a signed or customer-authorized request at block 305, determines whether the signature of the request is valid at block 306, and denies the request at block 307 otherwise. If the access request is a properly signed or customer-authorized request, the VMM 102 encrypts at least a portion of the requested computing resource data at block 309. The encrypting utilizes the provided key for encryption from the customer 131 to encrypt the requested resource data.

Thereafter, the encrypted resource data and non-encrypted resource data (e.g., the non-encrypted portion of the computing resource data) are transmitted to the requestor at block 311. Finally, an authorized or subsequently verified requestor may access the encrypted resource data at block 313. Authorized access to at least a portion of the encrypted resource data is described more fully below with reference to FIG. 4.

Figure 4:
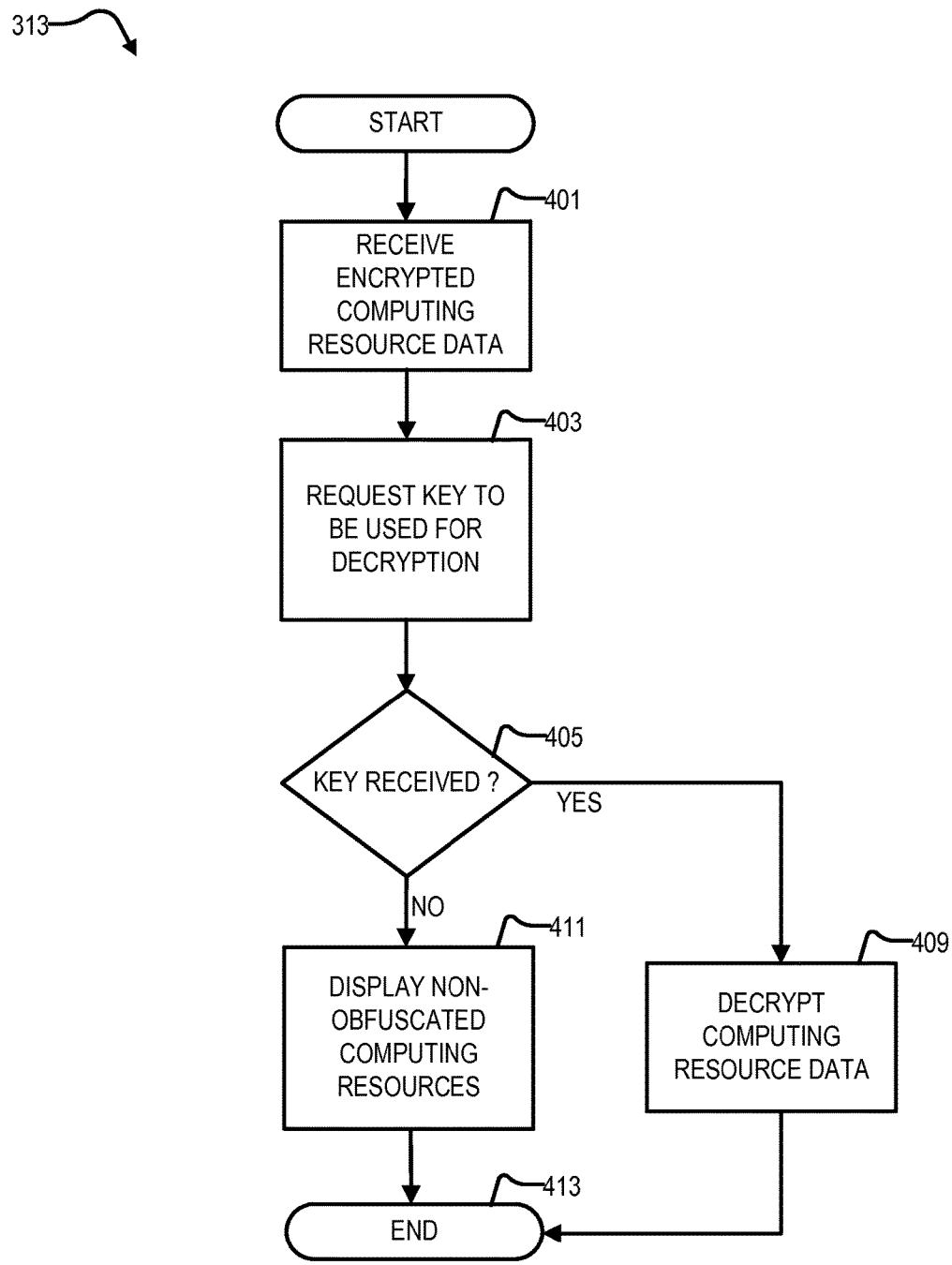
FIG. 4 is a flow diagram illustrating aspects of the operation of a resource monitoring environment in one particular configuration.

As shown in FIG. 4, the method 313 for accessing encrypted resources includes receipt of encrypted resource data by a requestor at block 401. For example, the encrypted resource data can be received at resource management application 124 at host computer 122 in control of an administrative user of the service provider network 120.

Thereafter, the requestor of the encrypted resource data requests a key to be used for decrypting the encrypted computing resource data at block 403. The request can be transmitted directly to the customer 131, to a supervisor of the service provider network 120, or to an authorized third party. If authorization is received from the customer, supervisor, or third party, the key to be used for decryption is received by the resource management application 124 at block 405, and the computing resource data may be decrypted using the key at block 409 and viewed/access through the resource management application 124. The key to be used for decryption can be a secure decryption key provided by the customer 131, a private key, a key generated at the service provider network 120, or another form of decryption key allowing decryption of the contents of the encrypted resource data.

If authorization is not received, non-obfuscated computing resource data, if available, are displayed through the resource management application 124 at block 411, and the method 400 ceases at block 413. Alternatively, no resources, including non-obfuscated resources, are displayed.

Thus, as described above, varying levels of restricted access are possible through multiple interactions with a customer 131, thereby providing assurances that only authorized access to sensitive information is possible at the permission of the customer. The restricted access is facilitated through the resource monitoring environment 100 described above, and includes the VMM 102, hardware resources 106, dedicated or customized hardware devices, and/or the resource management application 124.

According to some implementations, and as described briefly above, customized hardware devices and dedicated hardware devices, including specialized device adaptors, may implement any or all of the functionality of the resource monitoring environment 100. For example, a specialized device adaptor may interface with the hardware resources 106 of the host computer 104, and expose the API from which access requests 125 are generated. Accordingly, the specialized device adaptor can perform functions described above as being implemented by the VMM 102, hardware resources 106, and/or resource management application 124. According to one particular implementation, the specialized device adaptor is configured as a Peripheral Component Interconnect (PCI) device in operative communication with the host computer 104 via a PCI bus. This specialized device adaptor can include components associated with a typical computer device, including a processor, memory, non-volatile storage, NIC, and/or other components. Accordingly, this specialized device adaptor may be a "computer within a computer," and may process and restricted access functions as described herein.

Figure 5:
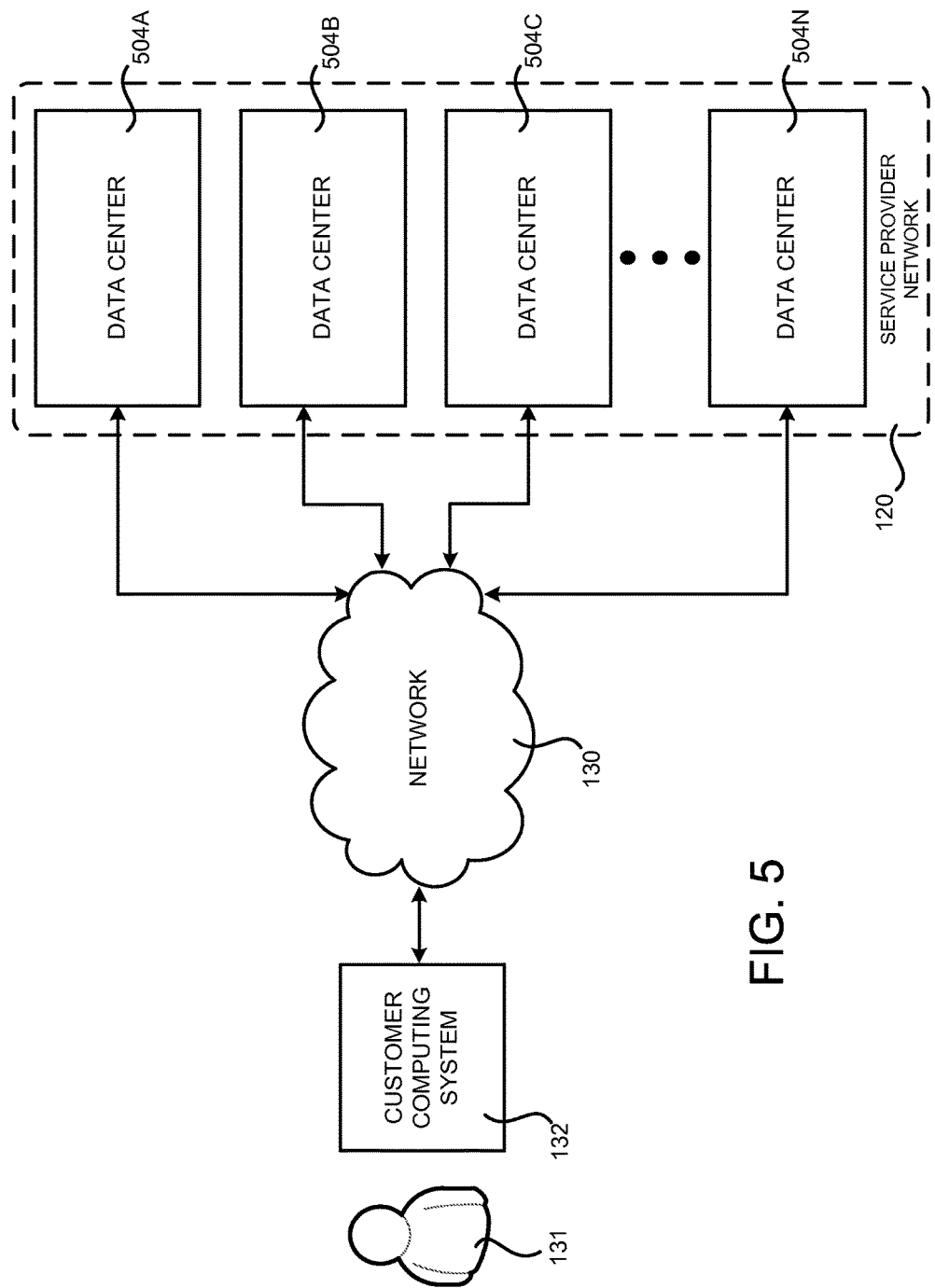
FIG. 5 is a system and network diagram that shows one illustrative operating environment for the technologies disclosed herein that includes a service provider network that may be configured to provide the functionality described herein.

Hereinafter, distributed computing environments and computer apparatuses which may be configured to use the techniques and procedures described above are described in detail with references to FIGS. 5-8. In particular, FIG. 5 is a system and network diagram that shows one illustrative computing environment for the technologies disclosed herein. As discussed above, the service provider network 120 can implement virtual machine instances 108 for use by customers 131 of the service provider network 120.

The virtual machine instances 108 may be configured to execute applications, including Web servers, application servers, media servers, database servers, and other types of applications. Data storage resources may also be provided, and may include file storage devices, block storage devices, and the like.

The virtual machine instances provided by the service provider network 120 are enabled in one implementation by one or more data centers 504A-504N (which may be referred herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 might also be located in geographically disparate locations. One illustrative configuration for a data center 504 that implements some of the technologies disclosed herein will be described below with regard to FIG. 6.

The customers 131 and other users of the service provider network 120 may access the computing resources provided by the service provider network 120 over the network 130, such as a WAN. For example, and without limitation, a customer computing system 132 might be utilized to access the service provider network 120 by way of the network 130. It should be appreciated that a local-area network (LAN), the Internet, or any other networking topology known in the art that connects the data centers 504 to remote customers 131 and other users may be utilized. It should also be appreciated that combinations of such networks might also be utilized.

Figure 6:
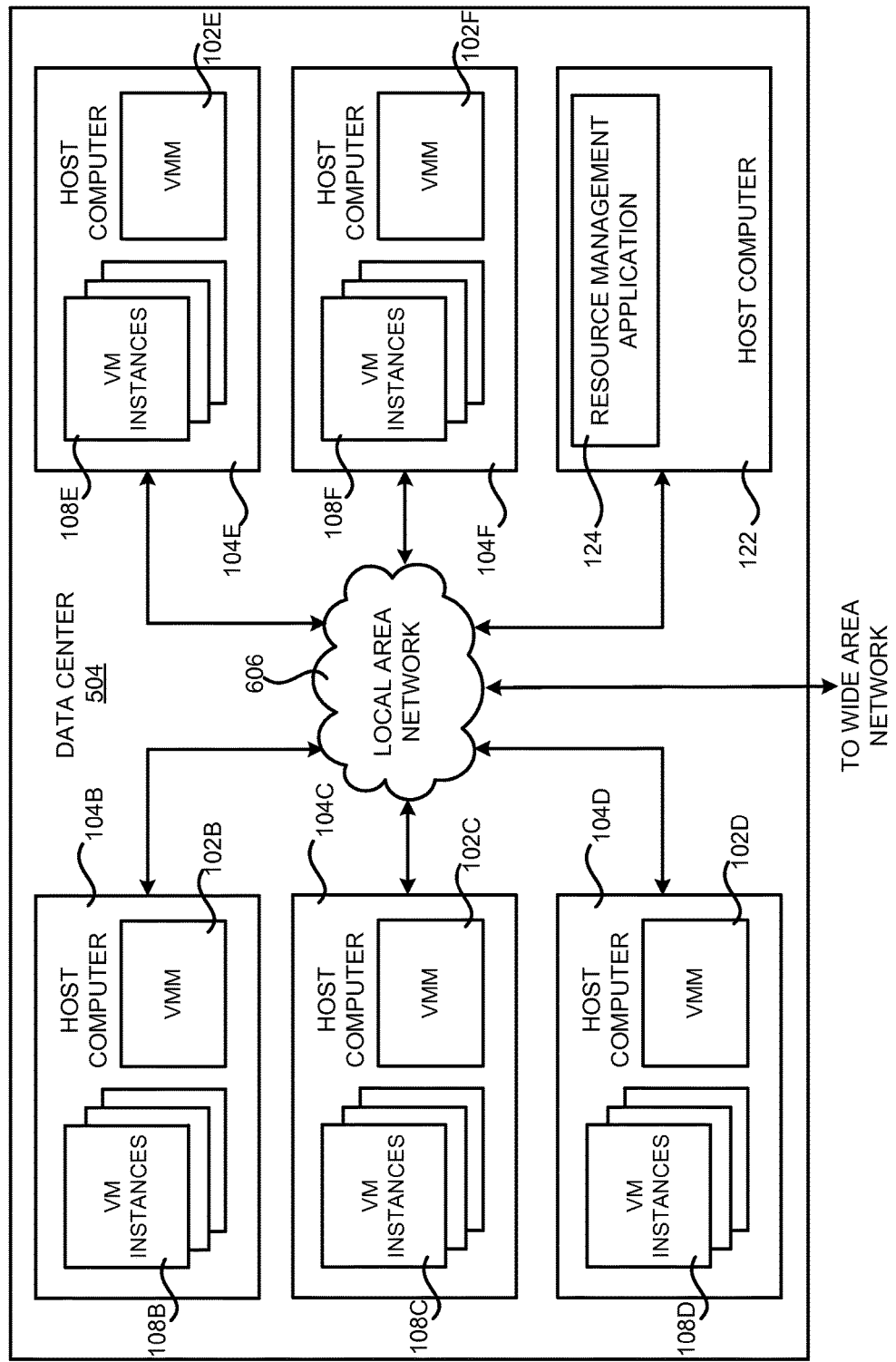
FIG. 6 is a computing system diagram that illustrates one configuration for a data center that implements aspects of the concepts and technologies disclosed herein, according to one configuration disclosed herein.

FIG. 6 is a computing system diagram that illustrates one configuration for a data center 504 that implements aspects of the concepts and technologies disclosed herein, according to one configuration disclosed herein. The example data center 504 shown in FIG. 6 includes several host computers 104B-104G (which may be referred to herein singularly as "a host computer 104" or in the plural as "the host computers 104") for providing virtual machine instances 108.

The host computers 104 may be standard tower, rackmount, or blade server computers configured appropriately for implementing the virtual machine instances 108 described herein. Host computers 104 in the data center 504 might also be configured to provide other services, such as those described above and potentially others.

The data center 504 shown in FIG. 6 also includes the host computer 122 that may be utilized for executing some or all of the software components described above for providing restricted access of computing resources through use of the resource management application 124, and the resource monitoring environment 100. The host computer 122 might also be configured to execute other components for providing some or all of the functionality described herein.

In the example data center 504 shown in FIG. 6, an appropriate LAN 606 is utilized to interconnect the host computers 104B-104G. The LAN 606 is also connected to the network 130 illustrated in FIGS. 1 and 5. It should be appreciated that the configuration and network topology illustrated in FIGS. 1, 5 and 6 has been greatly simplified and that many more computing systems, software components, networks, and networking devices may be utilized to interconnect the various computing systems disclosed herein and to provide the functionality described above. Appropriate load balancing devices or software modules might also be utilized for balancing a load between each of the data centers 504A-504N, and between each of the server computers 104B-104G, and 122 in each data center 504. It should be appreciated that the data center 504 described with respect to FIG. 6 is merely illustrative and that other implementations might be utilized.

Figure 7:
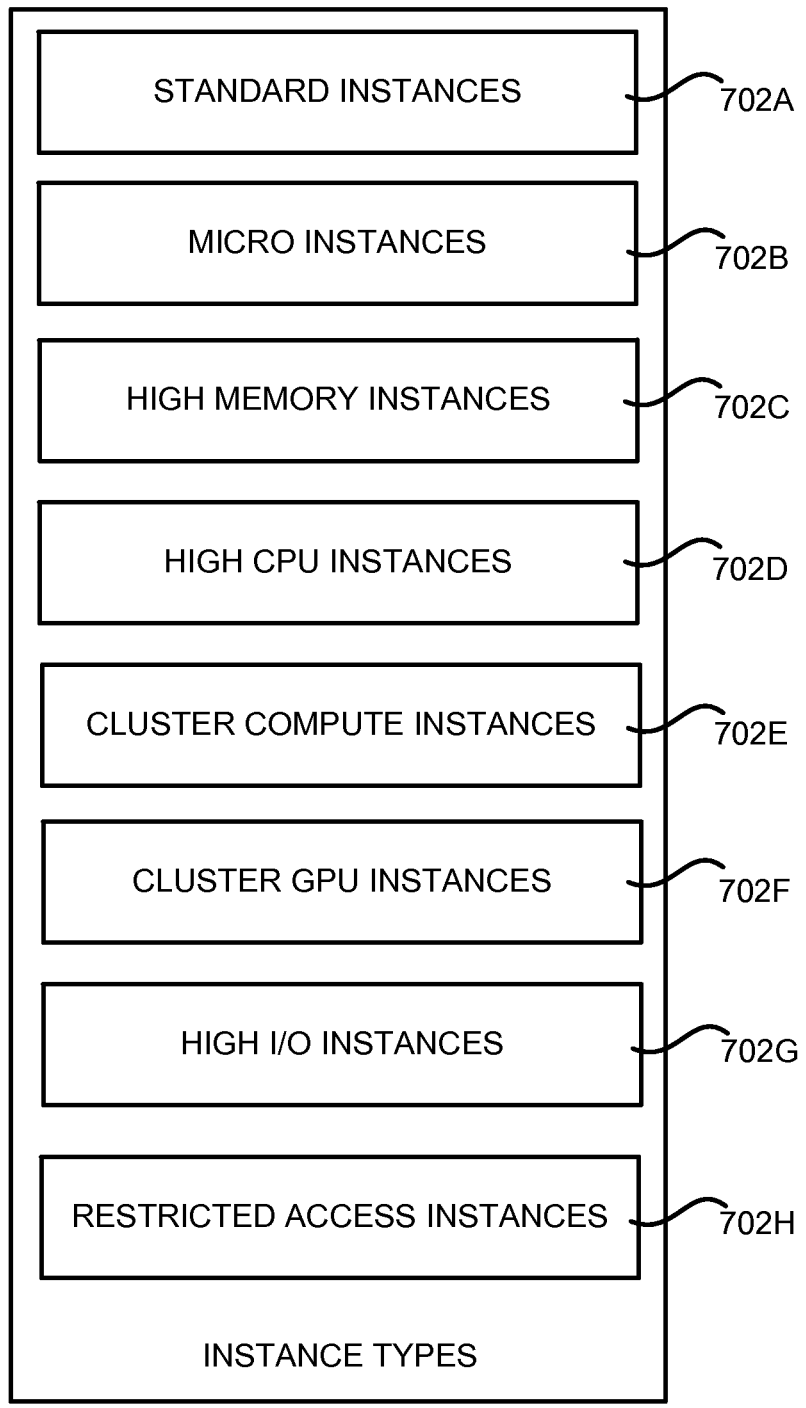
FIG. 7 is a block diagram showing aspects of various types of virtual machine instances that might be provided by a service provider network as described herein.

FIG. 7 is a block diagram showing aspects of various types 702 of virtual machine instances 108 that might be provided by the service provider network 120 and include restricted access based on the operation of the resource monitoring environment 100. The virtual machine instances 108 provided by the service provider network 120 may be made available to customers in a number of different types, or configurations. FIG. 7 illustrates several example instance types 702 that might be made available by a service provider through a service provider network 120: standard instances; micro instances; high memory instances; high central processing unit (CPU) instances; cluster compute instances; cluster graphics processing unit (GPU) instances, high input/output (I/O) instances; and restricted access instances. Aspects of each of these instance types will be described below.

Standard instances 702A are instances that are configured with generally proportional amounts of CPU and memory. Standard instances 702A may be suitable for common computing applications. Standard instances 702A may be made available in various sizes in some configurations. For example, "small", "medium", "large", and "extra large" instances may be made available, with each of these instances having greater amounts of CPU and memory, while maintaining approximately similar ratios of CPU to memory.

Micro instances 702B are instances that provide a small amount of consistent CPU resources and allow CPU capacity to be increased in short bursts when additional cycles are available. Micro instances 702B may be suited for lower throughput applications and Web sites that require additional compute cycles periodically.

High memory instances 702C are instances that have proportionally more random access memory (RAM) resources than CPU resources. High memory instances 702C may be suitable for high throughput applications, including database and memory caching applications. In contrast, high CPU instances 702D have proportionally more CPU resources than RAM memory resources and are well suited for compute-intensive applications.

Cluster compute instances 702E are instances that offer proportionally high CPU resources with increased network performance. Cluster compute instances 702E are well suited for High Performance Compute (HPC) applications and other demanding network-bound applications. Cluster GPU instances 702F are virtual machine instances that provide general-purpose GPUs with proportionally high CPU and increased network performance for applications benefitting from highly parallelized processing, including HPC, rendering and media processing applications. While cluster compute instances 702E provide the ability to create clusters of instances connected by a low latency, high throughput network, cluster GPU instances 702F provide an additional option for applications that can benefit from the efficiency gains of the parallel computing power of GPUs over what can be achieved with traditional processors.

High I/O instances 702G are instances that provide very high disk I/O performance and are suited for high performance database workloads and other jobs that require high disk performance. High I/O instances 702G may utilize solid state-drive (SSD)-based local instance storage for high I/O throughput. High I/O instances 702G might also provide high levels of CPU, memory, and network performance.

Restricted access instances 702H are instances that include any of the instances 702A-702G described above, as well as provide the ability for a customer to choose, set, or otherwise enable restricted access to computing resources as described herein. Accordingly, a restricted access instance 702H can be a micro instance, high CPU instance, or any other available instance, while also including the restricted access functionality described above. The restricted access instances 702H may be purchased by customers for use in the service provider network 120 as described above. Therefore, according to one implementation of the current technologies described herein, a business method may include providing restricted access instances including any or all of the features described herein. Customers may be charged a fee for implementing restricted access instances. Furthermore, the authorization data 136 associated with the restricted access virtual machine instance is selectable by the customer based on the amount of the fee, in some implementations. For example, preset or default authorization data or policies may be provided for selection by the customer based on an amount of the fee, or based on the level of service desired by the customer.

It should be appreciated that the various instance types described above are merely illustrative. Other instance types not described herein might be utilized with the various concepts and technologies described herein. Additionally, in some configurations, virtual machine instances 108 may be made available in various sizes having continuous ratios of CPU to memory.

It should also be appreciated that the various instance types described above might be utilized with various operating systems. For example, a customer 131 of the service provider network 120 might request to execute a high CPU instance 702D executing the LINUX operating system. Similarly, a customer 131 or other user of the service provider network 120 might request to use a cluster compute instance 702E executing the MICROSOFT WINDOWS SERVER operating system. Other operating systems might also be utilized.

Figure 8:
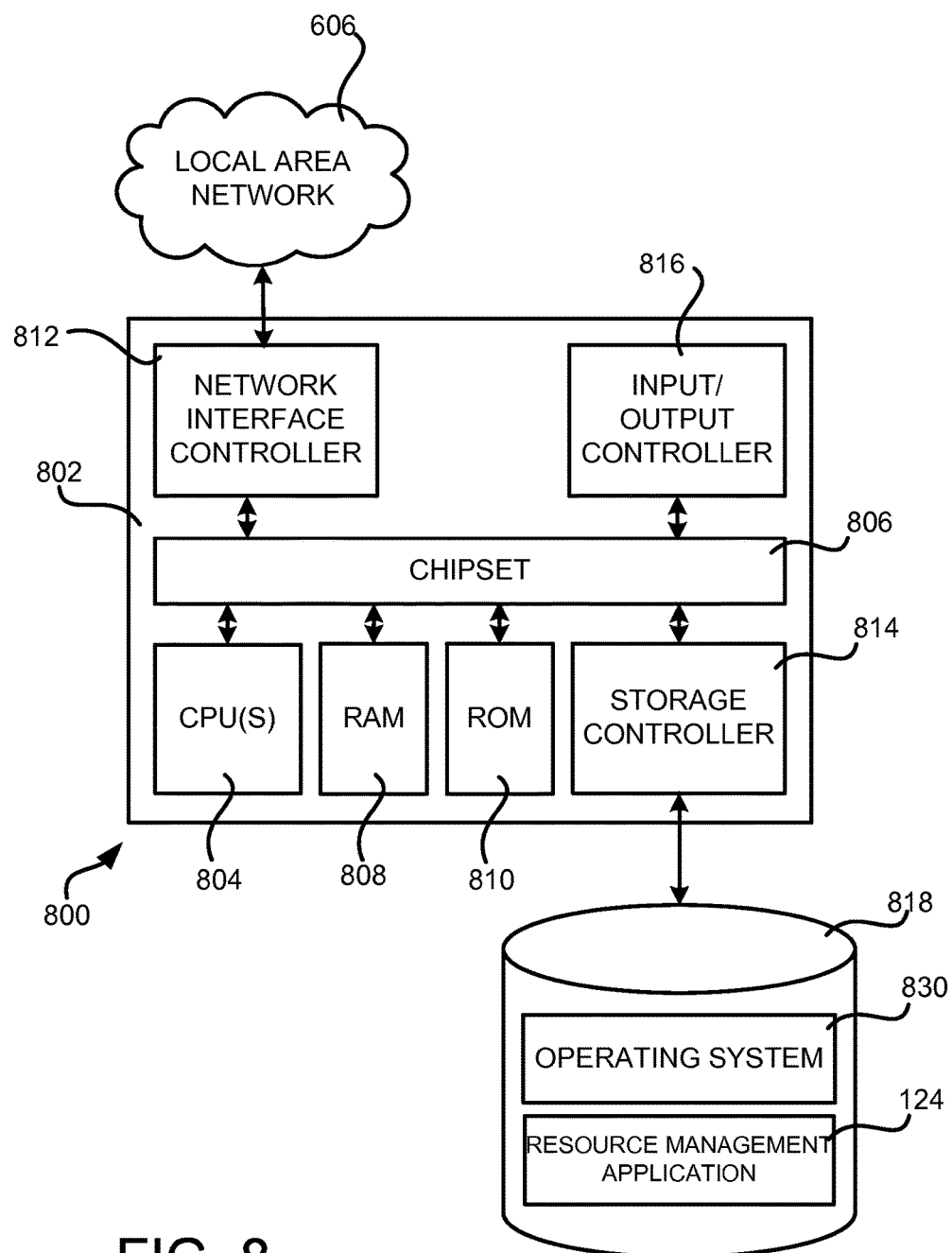
FIG. 8 is a computer architecture diagram showing an illustrative computer hardware architecture for implementing a computing device that might be utilized to implement aspects of the various technologies presented herein.

FIG. 8 shows an example computer architecture for a computer 800 capable of executing program components in the manner described above. The computer architecture shown in FIG. 8 illustrates a conventional server computer, workstation, desktop computer, laptop, tablet, network appliance, e-reader, digital cellular phone, or other computing device, and may be utilized to execute any of the software components presented herein. For example, the computer architecture shown in FIG. 8 may be utilized to execute the methods 200, 300, or 313. The computer architecture shown in FIG. 8 might also be utilized to implement a customer computing system 132 or any other of the computing systems described herein.

The computer 800 includes a baseboard 802, or "motherboard," which is a printed circuit board to which a multitude of components or devices may be connected by way of a system bus or other electrical communication paths. In one illustrative configuration, one or more central processing units (CPUs) 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a RAM 808, used as the main memory in the computer 800. The chipset 806 may further provide an interface to a computer-readable storage medium such as a read-only memory (ROM) 810 or non-volatile RAM (NVRAM) for storing basic routines that help to startup the computer 800 and to transfer information between the various components and devices. The ROM 810 or NVRAM may also store other software components necessary for the operation of the computer 800 in accordance with the configurations described herein.

The computer 800 may operate in a networked environment using logical connections to remote computing devices and computer systems through a network, such as the local area network 606. The chipset 806 may include functionality for providing network connectivity through a NIC 812, such as a gigabit Ethernet adapter. The NIC 812 is capable of connecting the computer 800 to other computing devices over the network 820. It should be appreciated that multiple NICs 812 may be present in the computer 800, connecting the computer to other types of networks and remote computer systems.

The computer 800 may be connected to a mass storage device 818 that provides non-volatile storage for the computer. The mass storage device 818 may store system programs, application programs, other program modules, and data, which have been described in greater detail herein. The mass storage device 818 may be connected to the computer 800 through a storage controller 814 connected to the chipset 806. The mass storage device 818 may consist of one or more physical storage units. The storage controller 814 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 800 may store data on the mass storage device 818 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 818 is characterized as primary or secondary storage, and the like.

For example, the computer 800 may store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 818 by detecting the physical states or characteristics of one or more particular locations within the physical storage units.

In addition to the mass storage device 818 described above, the computer 800 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

The mass storage device 818 may store an operating system 830 utilized to control the operation of the computer 800. According to one configuration, the operating system comprises the LINUX operating system. According to another configuration, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 818 may store other system or application programs and data utilized by the computer 800, such as the resource management application 124, and/or any of the other software components and data described above. The mass storage device 818 might also store other programs and data not specifically identified herein.

In one configuration, the mass storage device 818 or other computer-readable storage media is encoded with computer-executable instructions which, when loaded into the computer 800, transform the computer from a general-purpose computing system into a special-purpose computer capable of implementing the technologies described herein. These computer-executable instructions transform the computer 800 by specifying how the CPUs 804 transition between states, as described above. According to one configuration, the computer 800 has access to computer-readable storage media storing computer-executable instructions which, when executed by the computer 800, perform the various routines described above with regard to FIGS. 2, 3, and 4. The computer 800 might also include computer-readable storage media for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, the input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for resource monitoring and restricted access to computing resources and, potentially, other aspects of the operation of a virtual machine instance have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A computer-implemented method for providing a resource monitoring environment for restricting access to computing resources in a service provider network, the method comprising performing computer-implemented operations for:
    receiving authorization data from a computing device associated with a customer of a service provider network authorizing a requestor, different from the customer, to access at least a portion of computing resource data associated with one or more virtual machine instances configured to execute on behalf of the customer and associated with one or more computing resources provided by the service provider network, the authorization data including a public encryption key to be used for asymmetrical encryption of computing resource data in the service provider network;
    receiving a request to access the at least a portion of the computing resource data associated with the one or more virtual machines instances from the requestor, the portion of the computing resource data comprising sensitive computing resource data;
    determining that the request to access the at least a portion of the computing resource data is signed or authorized by the customer;
    in response to determining that the request is signed or authorized by the customer, encrypting the sensitive computing resource data using the public encryption key to create encrypted computing resource data and non-encrypted computing resource data; and
    providing the encrypted computing resource data and the non-encrypted computing resource data to the requestor.

2. The computer-implemented method of claim 1, further comprising:
    receiving a request to access the encrypted computing resource data by the requestor;
    receiving authorization from the customer to grant the request to access the encrypted computing resource data, the authorization including a second encryption key for decrypting the encrypted computing resource data; and
    providing the second encryption key to the requestor.

3. The computer-implemented method of claim 1, further comprising:
    determining that the request to access the at least a portion of the computing resource data is not signed or not authorized by the customer;
    in response to determining that the request is not signed or not authorized by the customer, removing the sensitive computing resource data from the computing resource data to create non-encrypted computing resource data; and
    providing the non-encrypted computing resource data to the requestor.

4. The computer-implemented method of claim 3, wherein the authorization data further includes information describing an authorization policy for accessing the sensitive computing resource data.

5. The computer-implemented method of claim 4, further comprising:
    comparing security credentials of the requestor to the authorization policy; and
    determining if the request to access the at least a portion of the sensitive computing resource data is authorized by the customer based on the comparison.

6. An apparatus comprising:
    a processor; and
    a non-transitory computer-readable storage medium having instructions stored thereupon which are executable by the processor and which, when executed, cause the apparatus to provide a resource monitoring environment configured to
- receive authorization data from a computing device associated with a first user of a service provider network authorizing a second user, different from the first user, to access at least a portion of computing resource data associated with one or more virtual machine instances configured to execute on behalf of the first user and associated with one or more computing resources provided by the service provider network, the authorization data including a public encryption key to be used for asymmetrical encryption of computing resource data in the service provider network and describing an authorization policy for accessing computing resource data associated with one or more computing resources of the service provider network;
- receive a request, from the second user, to access at least a portion of the computing resource data associated with the one or more virtual machines instances, the at least the portion of the computing resource data comprising sensitive computing resource data;
- determine that the second user is authorized by the first user to access the at least a portion of the computing resource data;
  - in response to determining that the second user is authorized, encrypting the sensitive computing resource data using the public encryption key to create encrypted computing resource data and non-encrypted computing resource data; and
  - provide a restricted response including the encrypted computing resource data and the non-encrypted computing resource data to the second user.

7. The apparatus of claim 6, wherein the virtual machine instance is configured to execute in the service provider network.

8. The apparatus of claim 6, wherein the restricted response includes an obfuscated portion and a non-obfuscated portion.

9. The apparatus of claim 8, wherein the obfuscated portion obfuscates the sensitive computing resource data and the non-obfuscated portion includes computing resource data permitted to be accessed by the second user.

10. The apparatus of claim 9, wherein the resource monitoring environment is further configured to:
- determine that the second user is not authorized to access the portion of the computing resource data; and
- in response to determining the second user is not authorized, deny access by the second user to the sensitive computing resource data.

11. The apparatus of claim 6, wherein the public key is provided by the first user.

12. The apparatus of claim 11, wherein the resource monitoring environment is further configured to:
- in response to determining that the second user is authorized, encrypting the portion of the computing resource data with the key to create encrypted computing resource data; and
- provide the encrypted computing resource data to the second user.

13. The apparatus of claim 6, wherein the resource monitoring environment comprises a virtual machine monitor configured to process the authorization data received from the first customer and the request received from the second user.

14. The apparatus of claim 6, wherein the resource monitoring environment comprises a dedicated hardware device configured to process the authorization data received from the first user and the request received from the second user.

15. A non-transitory computer-readable storage medium having computer-executable instructions stored thereupon which, when executed by a computer, cause the computer to:
- initiate a virtual machine instance for a first user, the virtual machine instance having authorization data associated therewith provided by or selected by the first user, the authorization data including a public encryption key to be used for asymmetrical encryption of computing resource data in the service provider network and authorizing a requestor, different from the first user, to access at least a portion of the computing resource data associated with the virtual machine instance;
- receive a request, from the requestor, to access a portion of computing resource data associated with the virtual machine instance from a service provider network, the portion of the computing resource data comprising sensitive computing resource data;
- determine, based at least in part on the authorization data, that the request to access the portion of computing resource data associated with the virtual machine instance from the service provider network is authorized by the first user;
- in response to determining that the request is authorized by the first user, encrypt the sensitive computing resource data using the public encryption key to create encrypted computing resource data and non-encrypted computing resource data; and
- provide the encrypted computing resource data and the non-encrypted computing resource data.

16. The non-transitory computer-readable storage medium of claim 15, wherein
the public encryption key is selected by the first user to create the encrypted computing resource data.

17. The non-transitory computer-readable storage medium of claim 16, wherein providing the encrypted computing resource data and the non-encrypted computing resource data further comprises:
- receiving a request to access the encrypted computing resource data;
- receiving authorization to grant the request to access the encrypted computing resource data, based at least in part on the authorization data provided by or selected by the first user;
- identifying a key to be used for decryption based on the received authorization; and
- causing the encrypted computing resource data to be decrypted using the identified key.

18. The non-transitory computer-readable storage medium of claim 15, wherein providing the encrypted computing resource data and the non-encrypted computing resource data comprises:
- obfuscating a portion of the computing resource data based on the authorization data; and
- allowing access by the service provider network to a non-obfuscated portion of the computing resource data.

19. The non-transitory computer-readable storage medium of claim 15, wherein the virtual machine instance is a restricted access virtual machine instance, and wherein the computer-readable storage medium has further instructions stored thereupon to cause the computer to charge a fee for operating the restricted access virtual machine instance to the first user.

20. The non-transitory computer-readable storage medium of claim 19, wherein the authorization data associated with the restricted access virtual machine instance is selectable by the first user based on the amount of the fee.

21. The non-transitory computer-readable storage medium of claim 15, wherein the authorization data indicates that at least two employees of the service provider network are required to authorize the received request.

22. The non-transitory computer-readable storage medium of claim 15, wherein the authorization data indicates that at least one of an administrative employee of the service provider network and an authorized member of the service provider network is required to authorize the received request.

* * * * *